2,994,681
COPOLYMERS OF ALKENYL-SUBSTITUTED AROMATIC COMPOUNDS AND ETHYLENICALLY UNSATURATED ETHERS AND THEIR USE IN PREPARING GRAFT COPOLYMERS WITH PREFORMED COPOLYMERS OF ALKENYL-SUBSTITUTED AROMATIC COMPOUNDS AND UNSATURATED ETHERS

Henry George Hammon, Columbus, Richard A. Clark, Worthington, and John W. Uttley, Jr., Hilliards, Ohio, assignors, by mesne assignments, to Shell Oil Company, Emeryville, Calif., a corporation of Delaware
No Drawing. Filed Oct. 29, 1958, Ser. No. 770,255
10 Claims. (Cl. 260—45.5)

This invention relates to new polymeric products and to their method for preparation. More particularly, the invention relates to a new class of copolymers and graft copolymers having improved clarity and unusually high impact strength.

Specifically, the invention provides new and particularly useful copolymers having high impact strength and good clarity comprising copolymers of certain proportions of (1) an alkenyl-substituted aromatic compound, (2) a monoethylenically unsaturated ether, such as, for example, vinyl butyl ether, and optionally a monoethylenically unsaturated ester.

As a further embodiment, the invention provides new graft copolymers having unusually high impact strengths. These new graft copolymers comprise the product of polymerization of (1) an alkenyl-substituted aromatic compound, (2) an ethylenically unsaturated ether, and (3) a preformed copolymer of an alkenyl-substituted aromatic compound and a monoethylenically unsaturated ether, or alternatively a preformed terpolymer of an alkenyl-substituted aromatic compound, an ethylenically unsaturated ether, and an ethylenically unsaturated ester.

Conventional polystyrenes and conventional copolymers and terpolymers containing a styrene, while useful as molding resins, do not exhibit unusually high impact strength. Some conventional, clear resins containing a styrene may exhibit somewhat higher impact strengths. However, these resins usually are soft, have low heat-distortion temperatures, and only obtain improved impact strength by sacrificing a certain amount of their other useful properties.

Because of the ready availability of styrene and substituted styrenes at favorable prices, a need exists in the art for clear, high-impact strength, styrene molding resins that have properties superior to molding resins based on polystyrenes or conventional copolymers and terpolymers containing a styrene. Impact strength commonly obtained with polystyrene and is co- or terpolymers is in the order of 0.2 to 0.5 ft./lb./in. notch. Styrene-base polymers having excellent molding properties and having impact strengths greater than 0.5 ft./lb./in. constitute a significant improvement in the art.

It is, therefore, an object of the invention to provide a superior molding resin. It is a further object to provide molding resins having superior impact strength. It is a further object to provide a high-impact molding resin having improved clarity. It is a further object to provide a new high-impact strength resin which is hard and has good heat resistance. These and other objects of the invention will be apparent from the following detailed description thereof.

It has now been discovered that these and other objects may be accomplished by the new copolymers of the invention comprising the product of polymerization of (1) certain proportions of an alkenyl-substituted aromatic compound, (2) a monoethylenically unsaturated ether, such as, for example, vinyl butyl ether, and optionally an ethylenically unsaturated ester. It has been found that these special copolymers have unexpected superior properties, particularly as to clarity and impact strength. The new copolymers, for example, have impact strength above those of conventional polystyrene and have impact strengths which, in many cases, go as high or higher than 1.8 ft./lb./in. notch. Surprisingly, these superior properties are obtained without sacrificing of other desired properties such as hardness and heat distortion point.

It has also been found that these special copolymers can be used to form valuable new graft polymers. The new graft copolymers are obtained by copolymerizing a mixture containing (1) an alkenyl-substituted aromatic compound, (2) an ethylenically unsaturated ether, and (3) the above-described preformed polymer of the alkenyl-substituted aromatic compound and the unsaturated ether and optionally an unsaturated ester. These special graft copolymers also have superior properties, particularly as to clarity and impact strength as noted in the working examples at the end of the specification.

The aforedescribed new graft copolymers are to be distinguished in structure from the conventional copolymers formed by polymerizing the initial mixture containing the monomers. In such a conventional process the resulting polymers have a random mixture of the two monomer units all along the polymer backbone chain. The new graft copolymers, however, comprise a backbone chain made up of a random mixture of the two monomer units and have attached thereto to the side of the chain additional polymer chains made up of the two monomer units. Such a structure is unique in that the backbone polymer retains its original structure and the modification is in the graft side chains instead of the backbone polymer. For clarity throughout the specification and claims, the initial preformed polymer used in making the graft copolymer may be described as a backbone copolymer and the added monomers copolymerized therewith may be described as the grafting monomers.

The new copolymers of the invention and those used in preparing the new graft copolymers of the present invention comprise the product of polymerization of certain proportions of an alkenyl-substituted aromatic compound and an unsaturated ether. The alkenyl-substituted aromatic compounds include those compounds having an alkenyl group, and preferably a 1-alkenyl group, e.g., a vinyl group, attached to a ring carbon atom of a aromatic ring. Examples of these include, among others, styrene, alpha-methylstyrene, vinyl toluene, 2-chlorostyrene, 4-chlorostyrene, 2,4-dichlorostyrene, 2,5-dichlorostyrene, vinylnaphthalene, 2-methylstyrene, 2,4-diethylstyrene, 2,3,4-trimethylstyrene, 2,4-diisobutylstyrene, 3-tert-butylstyrene, 4-octylstyrene, allylstyrene, 4-cyclohexylstyrene, and the like, and mixtures thereof. Preferred alkenyl-substituted aromatic compounds include the styrenes, such as styrene itself and the halogenated styrenes and styrenes substituted with hydrocarbon radicals, the substituents being on the vinyl side chain or on the aromatic ring. Particularly preferred are styrene, alpha-alkylstyrenes and the mono- and dichloro- and mono- and polyalkyl-substituted styrenes wherein the substituents are attached to ring carbon atoms, said substituted styrenes containing no more than 12 carbon atoms. Coming under special consideration, particularly because of the superior properties of the resulting products as well as the ready available and low cost is styrene itself.

The unsaturated monoethylenically unsaturated ethers to be used in the preparation of the preformed polymers comprise the aliphatic and cycloaliphatic ethers possessing an ethylenic group. The ethers may be unsubstituted, or substituted with substituents as halogen atoms. Examples of ethers which may be employed include, among others, vinyl alkyl ethers such as vinyl n-butyl ether, vinyl isobutyl ether, vinyl ethyl ether, vinyl 2-chloroethyl ether, vinyl propyl ether, vinyl isopropyl ether, vinyl 2-fluoroethyl ether, and vinyl pentyl ether; allyl alkyl ethers such as isopropenyl ethyl ether, propenyl n-butyl ether, propenyl isobutyl ether, propenyl 2-chloroethyl ether, propenyl 2-fluoroethyl ether, propenyl propyl ether, propenyl isopropyl ether, and propenyl pentyl ether; and butenyl alkyl ethers such as butenyl ethyl ether, butenyl propyl ether, butenyl isopropyl ether, butenyl n-butyl ether, butenyl isobutyl ether, butenyl 2-chloroethyl ether, butenyl 2-fluoroethyl ether, and butenyl pentyl ether. As the number of carbon atoms in the alkyl alkenyl ether is increased above 10, a decline in the favorable properties of the graft polymer would probably result. Remarkably superior properties are obtained, however, when (1) the alkyl alkenyl ether contains 4–7 carbon atoms, (2) the alkenyl radical is a vinyl or 1-propenyl radical, and (3) the alkyl radical contains 2 to 4 carbon atoms. Polymers exhibiting vastly superior properties are obtained when the ether is vinyl n-butyl ether.

The amount of the alkenyl-substituted aromatic compound and the ethylenically unsaturated ether used in making the preformed copolymers may vary within certain limits. The amount of the alkenyl-substituted aromatic compound should be between 60–99.9 parts by weight with the unsaturated ether making up 40 to .1 part by weight. Preferably the alkenyl-substituted aromatic compound constitutes 80–99.5 parts by weight and the unsaturated ether about 20–0.5 part by weight.

Unsaturated esters may also be used in the preparation of the preformed copolymers. The unsaturated esters include the monomeric organic esters possessing at least one

group and at least one carbon-to-carbon unsaturated linkage as an ethylenic linkage. A preferred group of the unsaturated esters comprise the esters of ethylenically unsaturated monocarboxylic acids and monohydric alcohols. Examples of this group comprise, among others, methyl methacrylate, ethyl methacrylate, butyl methacrylate, ethyl acrylate, isopropyl acrylate, cyclohexyl acrylate, allyl acrylate, allyl methacrylate, octyl acrylate, octenyl methacrylate, butyl crotonate, cyclohexyl crotonate, and the like. Another preferred group of unsaturated esters comprise the esters of ethylenically unsaturated monocarboxylic acids and polyhydric alcohols, such as, for example, ethylene glycol diacrylate, ethylene glycol dimethacrylate, butylene glycol dicrotonate, hexylene glycol diacrylate, ethylene glycol acrylate methacrylate and cyclohexenediol diacrylate. Another preferred group comprise the esters of saturated aliphatic or cycloaliphatic monohydric alcohols and unsaturated polycarboxylic acids, such as, for example, diethyl maleate, dibutyl fumarate, dibutyl 3-butenedioate acid and the like. Also useful, but less preferred are the esters of ethylenically unsaturated alcohols and monocarboxylic acids, such as allyl acetate, allyl butyrate, allyl propionate, allyl cyclohexanecarboxylate and the like.

Especially preferred are the esters of the ethylenically unsaturated aliphatic and cycloaliphatic monocarboxylic acids containing from 3 to 10 carbon atoms and the saturated aliphatic and cycloaliphatic monohydric alcohols containing from 1 to 10 carbon atoms, and the esters of the aforedescribed monocarboxylic acids and saturated aliphatic and cycloaliphatic di- and trihydric alcohols containing from 2 to 10 carbon atoms. Particularly superior results are obtained when the unsaturated ester contains from 8 to 12 carbon atoms. The ester is to be used as replacement of up to 25 parts of the ether. Preferably the ester makes up from 1 to 25 parts per 100 parts of polymer.

The copolymers of the alkenyl-substituted aromatic compound and the unsaturated ethers can be prepared by any suitable method.

They are preferably prepared by heating the monomers together in an aqueous system in the presence of a free radical yielding catalyst. Examples of the preferred catalysts include, among others, persulfuric acid, salts of peracids as ammonium persulfate, potassium persulfate, peracids as benzoyl peroxide, hydrogen peroxide, di-tertiary butyl peroxide, di-tert-butyl succinate, tert-butyl peracetate, di-tert-butyl dipermalonate, and 2,2-bis(tert-butylperoxy) butane and the like. The amount of the catalyst employed is preferably between 0.05% to 5% by weight of the monomers to be polymerized, and still more preferably, between 0.1% and 1.0% by weight thereof.

If an emulsion system is employed, any of the known agents may be used. These include particularly the ionic surface active agents, especially those having a polar structure including a hydrophilic (predominantly hydrocarbon) residue and a charged (ionic) radical thereon, such as anionic surface-active compounds including alkali metal and nitrogen-base soaps of higher fatty acids, such as potassium and/or sodium myristate, laurate, palmitate, oleate, stearate, ammonium stearate, etc., as well as the surface-active compounds of the cation-active variety, such as salts of long-chain aliphatic amines and quaternary ammonium bases, such as lauryl amine hydrochloride, stearyl amine hydrochloride, and palmityl amine hydrobromide. Additional examples of suitable ionic surface-active emulsifying agents include the alkali metal or ammonium alkyl or alkylene sulfates or sulfonates, such as sodium and/or potassium lauryl sulfate, alkyl, aryl and alkylated aryl sulfonates, cetyl sulfonate, oleyl sulfonate, stearyl sulfonate, sulfonated Turkey red oil, sulfonated mineral oils, sodium, potassium and ammonium isopropyl naphthalene sulfonate, amine soaps, such as triethanolamine stearate, amino-substituted alcohols, sulfonated fatty esters and amides, the hydrochloride of diethyl aminoethyloleylamide, trimethylcetyl ammonium methyl sulfate, alkanesulfonic acids, alkali metal and ammonium salts of sulphonated long-chain hydrocarbons, or sulphonated long-chain fatty acids, such as sulphonated oleic acid and the sodium, potassium and ammonium salts of sulphated cetyl alcohol. Starch, gumarabic, the polyoxyalkylene oxide condensates of hexitan anhydrides, carboxymethylcellulose, etc., may also be used.

In the event products are desired which have outstanding clarity, one should employ emulsifying agents such as tetrasodium - N-(1,2-dicarboxyethyl)-N-octadecylsulfosuccinamate, which is commercially available under the name of Aerosol 22 as a 35 percent active solution, sodium dodecylbenzene sulfonate, which is commercially available under the trade name of Ultrawet 30, and decylbenzene sodium sulfonate, which is available under the trade name of Santomerse S. Especially preferred is Aerosol 22.

The emulsifying agents are preferably employed in amounts varying from about .5% to 5% by weight of the monomers to be polymerized.

Temperatures employed in the formation of the copolymer will vary depending upon the catalyst selected. Preferred temperatures range from about 40° C. to about 150° C. Particularly preferred temperatures range from about 40° C. to 80° C. Superatmospheric, atmospheric, or subatmospheric pressures may be used as desired.

The polymerization is preferably accomplished in the absence of molecular oxygen. This is preferably accomplished by use of an inert gas as nitrogen or methane.

The copolymer can be recovered from the aqueous system by any suitable method as by freezing followed by thawing and filtering, coagulation with salt, alcohols, extraction, filtration and the like. If the copolymer is to be used to form a graft polymer as desired hereinafter, it should be retained in the aqueous medium and the graft formed in that latex.

The copolymers prepared by the above described method are soft to hard solids having molecular sets ranging from about 5,000 to 150,000 as determined by the light scattering technique as described in Chem. Rev., vol. 40, page 319 (1949). Polymers may be molded by conventional injection or compression in molding techniques and may be used to prepare molded articles, such as drinking tumblers, dishes, combs, toys, industrial equipment, and the like. Still another use for the polymers may be in the preparation of lenses where the optical requirements are not stringent, such as in the preparation of tail lights for automobiles.

As noted above, polymers are also particularly useful in the preparation of new graft copolymers. In this case, 80 to 40 parts of the copolymer is polymerized with 20 to 60 parts of ethylenically unsaturated monomer. Graft copolymers which have particularly outstanding properties, particularly as to clarity and impact strength, are those prepared by polymerizing an alkenyl-substituted aromatic compound and/or ethylenically unsaturated ether with the above described preformed copolymer.

If the monomer selected for the grafting process is an alkenyl-substituted aromatic compound, any one or more of the alkenyl-substituted aromatic compounds used in preparing the preformed copolymer as noted above may be utilized. The one selected need not be the one used in making the preformed polymer but in most cases it is the preferred one to use. Particularly superior results are obtained when the alkenyl-substituted aromatic compound makes up about 20 to 40 parts by weight and the preformed copolymer from 80 to 60 parts by weight.

If the monomers selected for the grafting process are mixtures of alkenyl-substituted aromatic compounds and the unsaturated ether, any one or more of the alkenyl-substituted aromatic compounds and unsaturated ethers used for making the preformed copolymer may be used. The ones selected need not be the ones used in making the preformed polymer but in most cases are the preferred ones to be used. Particularly superior results are obtained when the mixture of the alkenyl-substituted aromatic compounds and the unsaturated ethers make up about 30 to 50 parts and the preformed copolymer about 70 to 50 parts by weight. In a preferred embodiment, the mixture of the monomers make up about 30 to 40 parts by weight and the copolymer makes up about 70 to 60 parts by weight.

If a mixture of the above monomers are employed in making the graft copolymer, the alkenyl-substituted aromatic compounds and the alkenyl ethers are preferably employed in a weight ratio of varying from about 2:1 to 4:1. Particularly superior results are obtained when the alkenyl-substituted aromatic compounds and the alkenyl ethers are combined in a weight ratio of 3:1.

The graft copolymers of the invention are prepared by adding the above-described grafting monomers to the polymerization medium containing the preformed copolymer and then continuing the polymerization. In the preferred procedure, the desired monomers are added add at once or in small increments to the original latex and the mixture heated in an inert atmosphere.

In some cases, it may be desirable to add additional free radical yielding catalysts, such as those described above to speed the formation of the graft. Such catalysts are generally added in amounts varying from about 0.1% to 4% by weight.

Additional amounts of emulsifying agents may also be added. Particularly preferred agents include tetrasodium-N - (1,2 - dicarboxyethyl)-N-octadecylsulfosuccinamate, sodium dodecyl benzene sulfonate, and decylbenzene sodium sulfonate. Especially preferred is the above-described Aerosol 22. Such agents are preferably employed in amounts varying from about .5% to 5% by weight of the monomer and polymer being polymerized.

Temperatures employed in the formation of the graft will vary depending upon the rate desired, catalyst selected and the like. Preferred temperatures range from about 40° C. to about 200° C. Particularly preferred temperatures to be used with the conventional free radical yielding catalysts range from about 40° C. to about 80° C. Superatmospheric, atmospheric or subatmospheric pressures may be used as desired.

The graft reaction is conducted in the absence of molecular oxygen. This is preferably accomplished by conducting the reaction in the presence of an inert gas as nitrogen, methane and the like.

At the conclusion of the reaction, i.e., when substantially all of the monomer has been consumed, the graft copolymer can be recovered from the reaction mixture by any suitable method such as precipitation, extraction, filtration and the like. In the case of aqueous emulsions systems, the copolymer can be removed by freezing, coagulation with alcohols, acids and the like.

The graft copolymers prepared by the above process are soft to hard solids having molecular weights ranging from about 10,000 to about 250,000 determined by the light scattering technique. The copolymers may be molded by application of heat and/or pressure in conventional injection and compression molding techniques to form valuable molded articles. The copolymers are particularly suited for use in preparing articles, such as drinking tumblers, dishes, and food covers and the like. They should also prove useful in lens systems where optical requirements are not stringent, for example, in tail light covers for automobiles. Other uses will be obvious to those skilled in the art.

An antioxidant was added to some of the polymer compositions prepared in accordance with the teachings of this invention. In some instances the antioxidant was found to improve the impact strength of the polymer. However, improved high impact strengths were obtained even in the absence of an antioxidant. Suitable antioxidants include: trisubstituted phenol, 2,6-di-tertbutyl-4-methylphenol commercially available under the name of Ionol, butylated hydroxyanisole, commercially available under the name of Tenox and phenyl a-naphtylamine, to name a few.

The antioxidant is usually added after the polymerization reaction is completed and in an amount ranging from 0.2 to 1.0 part by weight. In most cases, the desired results are obtained when 0.3 to 0.5 part by weight of antioxidant is added.

The following examples more specifically describe a preferred manner in which the invention may be practiced and illustrate certain of its advantages and the benefits to be obtained therefrom. In the examples all parts are by weight, and impact strengths are in foot-pounds per inch, notch, determined in accordance with ASTM D256–54T, ⅛-inch bar.

EXAMPLE I

This example illustrates the preparation and properties of a copolymer of styrene and n-butyl ether.

A heavy-walled glass container was used as the reaction vessel in which to perform the polymerization. A water solution of tetrasodium-N-(1,2-dicarboxyethyl)-N-octadecylsulfosuccinamate was prepared, containing 1.5 parts of the emulsifier and 180 parts of water. The pH of this solution was adjusted to 10 by the addition of 10 percent sodium hydroxide solution. The following mixture was then placed in the glass container:

| Ingredients: | Parts by weight |
|---|---|
| Water | 180 |
| Tetrasodium - N - (1,2-dicarboxyethyl)-N-octadecylsulfosuccinamate | 1.5 |
| Ammonium persulfate | 1 |
| Tertiary-dodecyl mercaptan | 0.1 |
| Styrene | 85 |
| Vinyl n-butyl ether | 15 |

Air was removed from the container by purging with nitrogen. The container was closed with a self-sealing cap, and the container was then placed in a rack and rotated end-over-end in a thermostatically controlled water bath set at 50° C. The reaction was run to or near completion. Butylated hydroxyanisole, 0.4 part, was then added.

The copolymer so formed was clear and exhibited an impact strength of 1.30.

EXAMPLE II

Following the procedure of Example I, 85 parts of styrene and 15 parts of ethyl vinyl ether were polymerized to form a copolymer. No antioxidant was added.

This copolymer was clear and exhibited an impact strength of 0.91.

EXAMPLE III

Following the procedure of Example I, 85 parts of styrene and 15 parts of 1-propenyl ethyl ether were polymerized to form a copolymer. The polymerization temperature was 50° C. and 3.0 parts of tetrasodium-N-(1,2-dicarboxyethyl)-N-octadecylsulfosuccinamate were used as the emulsifier. No antioxidant was added.

The copolymer thus prepared was clear and exhibited an impact strength of 1.3.

EXAMPLE IV

Following the procedure of Example I, 85 parts of styrene and 15 parts of vinyl isobutyl ether were copolymerized at 50° C., using 3.0 parts of tetrasodium-N-(1,2-dicarboxyethyl) - N - octadecylsulfosuccinamate as the emulsifier. Trisubstituted phenol, 0.3 part, was added as a stabilizer.

The copolymer thus formed was clear and exhibited an impact strength of 0.86.

EXAMPLE V

Following the procedure of Example I, 85 parts of styrene and 15 parts of vinyl 2-chloroethyl ether were copolymerized, using 3.0 parts of tetrasodium-N-(1,2-dicarboxyethyl) - N - octadecylsulfosuccinamate as the emulsifier. Phenyl a-naphthylamine, 0.5 part, was added as a stabilizer.

This copolymer had an impact strength of 0.68.

EXAMPLE VI

Several copolymers of styrene and 1-propenyl ethyl ether were prepared, in which styrene was present to the extent of 90 parts by weight or greater. The essential details of the polymerization procedure and the properties of the resulting copolymers are summarized in the following table:

Summary of data

| Styrene, parts | Propenyl Ethyl Ether, parts | Polymerization Temp.,°C. | Emulsifier,[1] parts | Butylated Hydroxyanisole, parts | Impact Strength |
| --- | --- | --- | --- | --- | --- |
| 90 | 10 | 50 | 3.0 | 0.8 | 1.65 |
| 90 | 10 | 65 | 3.0 | 0.8 | 0.63 |
| 95 | 5 | 50 | 3.0 | 0.8 | 1.52 |
| 95 | 5 | 65 | 3.0 | 0.8 | 1.10 |
| 97 | 3 | 50 | 3.0 | 0.8 | 1.30 |
| 97 | 3 | 65 | 3.0 | 0.8 | 1.0 |
| 99 | 1 | 50 | 3.0 | 0.8 | 1.58 |
| 99 | 1 | 65 | 3.0 | 0.8 | 1.29 |
| 99.25 | 0.75 | 65 | 1.5 | 0.4 | 1.50 |
| 99.5 | 0.5 | 65 | 1.5 | 0.4 | 0.83 |
| 99.75 | 0.25 | 65 | 1.5 | 0.4 | 0.80 |
| 99.9 | 0.1 | 65 | 1.5 | 0.4 | 1.20 |

[1] Tetrasodium-N-(1,2-dicarboxyethyl)-N-octadecylsulfosuccinamate.

All of the above copolymers were clear except that containing 99.75 parts of styrene, which was cloudy.

EXAMPLE VII

A copolymer backbone, containing 54 parts of styrene and 6 parts of vinyl butyl ether were polymerized at 50° C., in accordance with the procedure outlined in Example I; tetrasodium-N-(1,2-dicarboxyethyl)-N-octadecylsulfosuccinamate, 1.5 parts, was used as the emulsifier. Next, 30 parts of styrene and 10 parts of vinyl butyl ether were grafted upon the copolymer backbone. This was accomplished by adding the graft ingredients to the reaction chamber containing the copolymer backbone. The polymerization was then allowed to continue at 50° C. A clear graft polymer was thus prepared, which exhibited an impact strength of 1.78.

EXAMPLE VIII

A copolymer backbone, consisting essentially of 54 parts of styrene and 6 parts of vinyl isobutyl ether, was polymerized at 50° C. A graft of 30 parts of styrene and 10 parts of vinyl isobutyl ether was then polymerized with the backbone, at 50° C., forming a clear graft polymer. The detailed procedure followed was that outlined in Example VIII. The impact strength of this graft polymer was 0.58.

EXAMPLE IX

A copolymer backbone, consisting essentially of 54 parts of styrene and 6 parts of vinyl isobutyl ether, was polymerized at 50° C., using 3 parts of tetrasodium-N-(1,2-dicarboxyethyl)-N-octadecylsulfosuccinamate as the emulsifier. The polymerization was then continued in the presence of a graft consisting of 30 parts of styrene and 10 parts of vinyl isobutyl ether. Tri-substituted phenol, 0.3 part, was added after completion of the reaction.

The graft polymer formed was light brown in color, but transparent, and exhibited an impact strength of 1.12.

EXAMPLE X

A copolymer backbone, consisting essentially of 54 parts of styrene and 6 parts of ethyl vinyl ether, was polymerized at 50° C. A graft of 30 parts of styrene and 10 parts of ethyl vinyl ether was then added to the reaction chamber containing the copolymer backbone and the polymerization was continued. A clear, light-brown graft polymer was formed with an impact strength of 0.62.

EXAMPLE XI

The same ingredients as were present in Example X were polymerized. Butylated hydroxyanisole, 0.5 part, was added. The graft polymer formed had an impact strength of 1.05.

EXAMPLE XII

A graft of 30 parts of styrene and 10 parts of propenyl ethyl ether was polymerized with a copolymer backbone consisting esentially of 54 parts of styrene and 6 parts of propenyl ethyl ether; tetrasodium-N-(1,2-dicarboxyethyl)-N-octadecylsulfosuccinamate, 3.0 parts, was an additional ingredient in the reaction chamber. Butylated hydroxyanisole, 0.4 part, was added after the completion of the polymerization reaction.

The clear graft polymer formed had an impact strength of 1.2.

EXAMPLE XIII

A terpolymer of 50 parts of styrene, 5 parts of ethyl acrylate and 5 parts of 1-propenyl ethyl ether was prepared by heating these components in an aqueous emulsion as described in Example I in the presence of 1% by weight of ammonium persulfate. The resulting solid terpolymer had good clarity and impact resistance.

EXAMPLE XIV

A mixture of 30 parts of styrene and 10 parts of ethyl acrylate was grafted upon a terpolymer, consisting of 50 parts of styrene, 5 parts of ethyl acrylate and 5 parts of propenyl ethyl ether. The 3-component graft polymer thus formed had an impact strength of 1.15.

EXAMPLE XV

A graft of 30 parts of styrene was polymerized with a copolymer backbone consisting essentially of 55 parts of styrene and 15 parts of vinyl isobutyl ether; tetrasodium - N - (1,2-dicarboxyethyl) - N-octadecylsulfosuccinamate, 3.0 parts, was an additional ingredient in the reaction chamber. Tri-substituted phenol, 0.3 part, was subsequently added.

A clear graft polymer was formed which had an impact strength of 0.79.

EXAMPLE XVI

A graft of 30 parts of styrene was polymerized by emulsion polymerization techniques with a copolymer backbone consisting essentially of 55 parts of styrene and 15 parts of vinyl ether.

A clear graft polymer formed exhibited an impact strength of 0.76.

EXAMPLE XVII

A graft of 30 parts of styrene was polymerized by emulsion polymerization techniques with a copolymer backbone consisting essentially of 55 parts of styrene and 15 parts of vinyl n-butyl ether. Butylated hydroxyanisole, 0.4 part, was added to the reaction mixture after completion of the polymerization reaction.

The clear graft polymer formed had an impact strength of 1.08.

EXAMPLE XVIII

When methyl styrene, ethyl styrene, dimethyl styrene, or mixtures thereof are used in place of all, or part, of the styrene in the preceding examples, there will be obtained graft polymers having impact strengths equal, or superior, to conventional polystyrenes.

EXAMPLE XIX

If methyl acrylate, ethyl methacrylate, methyl methacrylate, ethylene glycol diacrylate and dimethyl fumarate or mixtures thereof, are used in place of all, or part, of the ethyl acrylate in Examples XIII and XIV there will be obtained polymers and graft polymers having impact strengths equal, or superior, to conventional polystyrenes.

EXAMPLE XX

When 1-butenyl ethyl ether, 1-butenyl propyl ether, 2-butenyl butyl ether, or mixtures thereof, are used in place of all, or part, of the vinyl alkyl ethers and 1-propenyl alkyl ethers in the preceding examples, there will be obtained graft polymers and copolymers having impact strengths equal, or superior, to conventional polystyrenes.

It is obvious from the above description and examples that later modifications can be made without departing from the spirit and scope of the invention. It is intended that all such modifications should be included hereunder.

We claim as our invention:

1. A terpolymer of an alkenyl-substituted aromatic compound selected from the group consisting of styrene, alpha-alkylstyrenes and mono- and dichloro- and mono- and polyalkyl-substituted styrenes wherein the substituents are attached to ring carbon atoms, said substituted styrenes containing up to 12 carbon atoms, an acrylic acid ester of an aliphatic saturated monohydric alcohol and a 1-alkenyl alkyl ether containing from 1 to 10 carbon atoms, the alkenyl-substituted aromatic compound making up from 60 to 99 parts, the unsaturated ether making up from 30 to 0.9 part and the acrylate ester making up from 10 to 0.1 part.

2. A new graft copolymer composition comprising the product of polymerization of (1) an alkyl-substituted aromatic compound selected from the group consisting of styrene, alpha-alkylstyrenes and mono- and dichloro- and mono- and polyalkyl-substituted styrenes wherein the substituents are attached to ring carbon atoms, said substituted styrenes containing up to 12 carbon atoms, (2) a monoethylenically unsaturated ether, and (3) a preformed copolymer of an alkenyl-substituted aromatic compound hereinbefore described, a 1-alkenyl alkyl ether and an acrylic acid ester of an aliphatic saturated monohydric alcohol containing from 1 to 10 carbon atoms.

3. A graft copolymer composition as in claim 2 wherein the alkyl 1-alkenyl ether contains up to 10 carbon atoms.

4. A graft copolymer composition as in claim 2 wherein the 1-alkenyl alkyl ether is an ethyl vinyl ether.

5. A graft copolymer composition as in claim 2 wherein the acrylic acid ester is ethyl acrylate.

6. A graft copolymer composition as in claim 2 wherein the alkyl 1-alkenyl ether is a vinyl isobutyl ether.

7. A graft copolymer as in claim 2 wherein the 1-alkenyl ether is vinyl 2-chloroethyl ether.

8. A graft copolymer as in claim 2 wherein the 1-alkenyl ether is vinyl butyl ether.

9. A graft copolymer as in claim 2 wherein the 1-alkenyl ether is 1-propenyl ethyl ether.

10. A new graft copolymer composition comprising the product of polymerization of (1) 30 to 50 parts by weight of a mixture of (a) an alkyl-substituted aromatic compound selected from the group consisting of styrene, alpha-alkylstyrenes and mono- and dichloro- and mono- and polyalkyl-substituted styrenes wherein the substituents are attached to ring carbon atoms, said substituted styrenes containing up to 12 carbon atoms, and (b) a monoethylenically unsaturated ether, and (2) 70 to 50 parts by weight of a preformed copolymer of an alkenyl-substituted aromatic compound hereinbefore described, a 1-alkenyl alkyl ether and an acrylic acid ester of an aliphatic saturated monohydric alcohol containing from 1 to 10 carbon atoms.

References Cited in the file of this patent

UNITED STATES PATENTS

| 2,016,490 | Fikentscher | Oct. 8, 1935 |
| 2,617,787 | Tawney | Nov. 11, 1952 |
| 2,643,991 | Tawney | June 30, 1953 |

FOREIGN PATENTS

| 634,408 | Germany | Aug. 26, 1936 |

OTHER REFERENCES

Bawn: "The Chemistry of High Polymers," page 20, published by Interscience Pub. Inc., New York.

Bawn: "The Chemistry of High Polymers," page 55, published by Interscience Pub. Inc., New York.